United States Patent [19]
Probst et al.

[11] Patent Number: 5,982,047
[45] Date of Patent: Nov. 9, 1999

[54] PRESSURE SWITCHING DEVICE

[75] Inventors: Uwe Probst, Steisslingen; Robert Skofljanec, Hornberg, both of Germany

[73] Assignee: TRW Fahrzeugelektrik GmbH & Co. KG, Germany

[21] Appl. No.: 08/929,614

[22] Filed: Sep. 15, 1997

[30] Foreign Application Priority Data

Sep. 16, 1996 [DE] Germany ............ 196 37 607

[51] Int. Cl.$^6$ .................................. H01H 35/24
[52] U.S. Cl. ............... 307/9.1; 307/118; 307/144; 73/700; 123/146.5 C; 200/81 R; 340/626
[58] Field of Search ............... 307/9.1, 118, 144; 73/861.65, 700; 200/701, 81 R, 700; 340/603, 626; 123/146.5 C; 318/645

[56] References Cited

U.S. PATENT DOCUMENTS

| | | | |
|---|---|---|---|
| 3,646,811 | 3/1972 | DeLeo et al. | 73/861.65 |
| 3,789,338 | 1/1974 | Szeverenyi et al. | 340/626 |
| 4,117,724 | 10/1978 | Cook | 73/701 |
| 4,211,119 | 7/1980 | Wolber | 123/445 |
| 4,396,466 | 8/1983 | Hetrick et al. | 205/785 |

FOREIGN PATENT DOCUMENTS

| | | |
|---|---|---|
| 2129470 | 8/1994 | Canada . |
| 0 292 606 A2 | 9/1987 | European Pat. Off. . |
| 2 320 766 | 4/1973 | Germany . |
| 35 19 908 A1 | 6/1985 | Germany . |
| 43 26 343 A1 | 8/1993 | Germany . |
| 05126660 | 5/1993 | Japan . |

OTHER PUBLICATIONS von Dipl.—Ing. Gerhard Berge, "Druckmesstechnik—Neue Möglichkeiten Durch Kombination Innovativer Techniken," 118 *Messen Prüfen Automatisieren*, Bad Wörishofen, DE, No. 5, May 1989, pp. 218–222.

"Verschleissfreier Druckschalter", 449 *F&M Feinwerktechnik&Messtechnik*, 102, Munchen, DE, No. 4, Apr. 1994, p. 186.

*Primary Examiner*—Albert W. Paladini
*Attorney, Agent, or Firm*—Fay, Sharpe, Fagan, Minnich & McKee, LLP

[57] ABSTRACT

The invention relates to a pressure switching device of the type used in motor vehicles and includes a pressure sensor 21 arranged in a housing 3, which generates an electrical signal U according to the pressure p of a pressure medium or monitored fluid transmitted through a supply opening 15 of housing 3. The pressure switching devices includes an interpretation and switching unit 55 adapted to received the electrical sensor signal U and is further adapted to compare the sensor signal with at least one switching threshold value to trigger a switching function or a sequence of switching functions upon the electrical sensor signal exceeding and/or falling short of the switching threshold value.

27 Claims, 2 Drawing Sheets

PRESSURE SWITCHING DEVICE

BACKGROUND OF THE INVENTION

The present invention relates to pressure switching devices and more particularly to pressure switching devices of the type used in motor vehicles for sensing the pressure of a fluid and, based upon the sensed pressure, trigger a variety of switching procedures such as illuminating warning lights or the like. Such pressure switching devices find particular application in connection with monitoring oil pressure or brake pressure in a motor vehicle.

Previously known pressure switches have generally included a mechanical control device which is responsive to the pressure of a monitored fluid to execute translatory movement. Using this technology, the mechanical control device occupies a certain position dependent upon the pressure of the monitored fluid and moves in response to pressure changes. As a result of the movement of the controlled device, an electrical contact within the switch is closed at a predefined pressure threshold value. In devices such as this, the pressure threshold value is generally determined by either the tension of a spring in the pressure switch or the position of the contacts within the switch or by a combination of the two. The spring tension acts in a direction opposing the pressure force generated by the monitored fluid. The switching contacts can be disposed in different positions along the translatory movement of the mechanical control device to effect changes in the pressure threshold value.

In addition to the above, mechanical pressure switches are also known to include multiple switching pressure threshold values. In devices such as this, determination of the pressure threshold values are accomplished by providing electrical contacts at multiple predetermined switching positions along the adjustable path of the moveable control device. The electrical contacts are positioned at locations corresponding to the specified switching pressure threshold values.

BRIEF DESCRIPTION OF THE INVENTION

Although the prior art devices described above have met with some success, they are generally difficult to modify in order to meet specific customer needs or requests. As an example, in order to provide more or less switching contacts of the switching pressure threshold values, a redesign of the switch becomes necessary. Even in the case that only a single switching pressure threshold value is to be changed, mechanical intervention or other redesigning of the switches becomes necessary for each change.

It is therefore an object of the present invention to provide a pressure switching device, which is adjustable to meet customer needs and, more particularly, which is adjustable with regard to the switching threshold values and the number of switching threshold values.

The invention achieves this object with the characteristics of patent claim 1. In particular, by providing an interpretation and switching unit in the pressure switch device, at least a one of a first switching function signal and a sequence of second switching function signals are generated by the pressure switch device based on a relative level or difference between an electrical sensor signal and a selectable switching threshold value.

The present invention is based on the realization that, as a result of the utilization of a pressure sensor which converts the pressure of the monitored fluid into an electrical signal internal to the switch, and through corresponding electronic interpretation of the signal, a high degree of flexibility is built into the pressure switching device with respect to its adjustability to meet customer needs. The present invention exploits the advantage of electronic interpretation of the pressure signal through relatively simple changes in the signal interpretation device within the switch.

In the preferred embodiment of the present invention, the pressure switching device includes an interpretation and switching unit which is adapted to analyze and process the electrical signal generated by a pressure sensor. The interpretation and switching unit is jointly integrated within the pressure sensor in a housing comprising the pressure switching device. In the preferred embodiment of the present invention, the interpretation and switching unit includes a memory for storing one or more switching threshold values for defining a corresponding set of switching threshold points.

In addition to the above, according to the present invention, one or more switching threshold values are associated with a timer or a predetermined timer period, so that the switching states attained after each switching process or event are maintainable for at least the predetermined timer periods assigned to the respective switching threshold values. In this manner, the present invention realizes a temporary hysteresis of the respective switching functions to provide a monostable switching element.

For realization of a hysteresis with respect to pressure, two switching threshold values are additionally respectively assigned to each other as a switching threshold value pair. In that manner, the higher or lower of the switching threshold value pair defines the switching point for a switch over from a first switching state to a second switching state. The respective other of the switching threshold value pair values defines the switching point for the switch over from the second switching state to the first switching state. Thus, upon an increase in the monitored pressure over the higher of the two switching threshold values, a first signal is generated to trigger a first switch state which is extinguished to then trigger a second switch state only when the pressure falls below the lower of the two switching threshold values. In this manner, unstable conditions are avoided including oscillations between switching states. If only a single switching threshold value were used, short time fluctuations would occur when the monitored fluid is at or near the switching point. The present invention overcomes this instability.

Further in connection with the present invention, the switching threshold values are stored in a non-transient memory, preferably a read only memory (ROM) within the switching device. The interpretation and switching unit is preferably an electronic microprocessor circuit wherein the switching functions are realized by means of appropriate software executed by the microprocessor circuit. Adaptation of the pressure sensing device of the present invention to meet various customer demands is easily accomplished by simply making changes to the software. In the present invention, the electronic microprocessor circuitry is adequately dimensioned with respect to the hardware, specifically with a view toward the number of possible switching output connections from the device body.

In its preferred form, the interpretation and switching unit comprises a user-specific integrated circuit such as an application-specific integrated circuit (ASIC) upon which the switching functions are realized. In that manner, with any redesign of the pressure switching device, only a redesign of a ASIC becomes necessary. This is much less expensive than modification to the mechanical components of the prior art previously known pressure switches.

Still yet further in connection with the preferred embodiment of the invention, a plurality of electrical contact points on the interpretation and switching unit are connected to a corresponding plurality of connection contacts on the housing of the device making the switching functions available to external devices. Based upon the ruggedness and capacity of the electronics forming the interpretation and switching unit, direct switching of higher outputs by customers is possible in the present invention.

While it is possible to transmit analog electronic sensor signals proportional to the monitored pressure over long distances, malfunctions and signal degradation often occurs, typically from electronic interference pickup and the like. Therefore, in another embodiment of the present invention, the interpretation and switching unit is connected to a bus interface disposed within the body of the switching device. The bus interface, together with the interpretation and switching unit, transmits control data and switching function information to external operatively associated control units. Using the bidirectional bus interface, the switching functions themselves are triggerable by the external operatively associated control units. The bus interface is preferably disposed within the housing of the pressure switch device.

Additional specific embodiments are evident form the depend claims.

In the following, the invention is explained in more detail on the basis of the specific embodiment illustrated in the drawings.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein.

DETAILED DESCRIPTION OF THE PREFERRED EMBODIMENT

Figure 1:
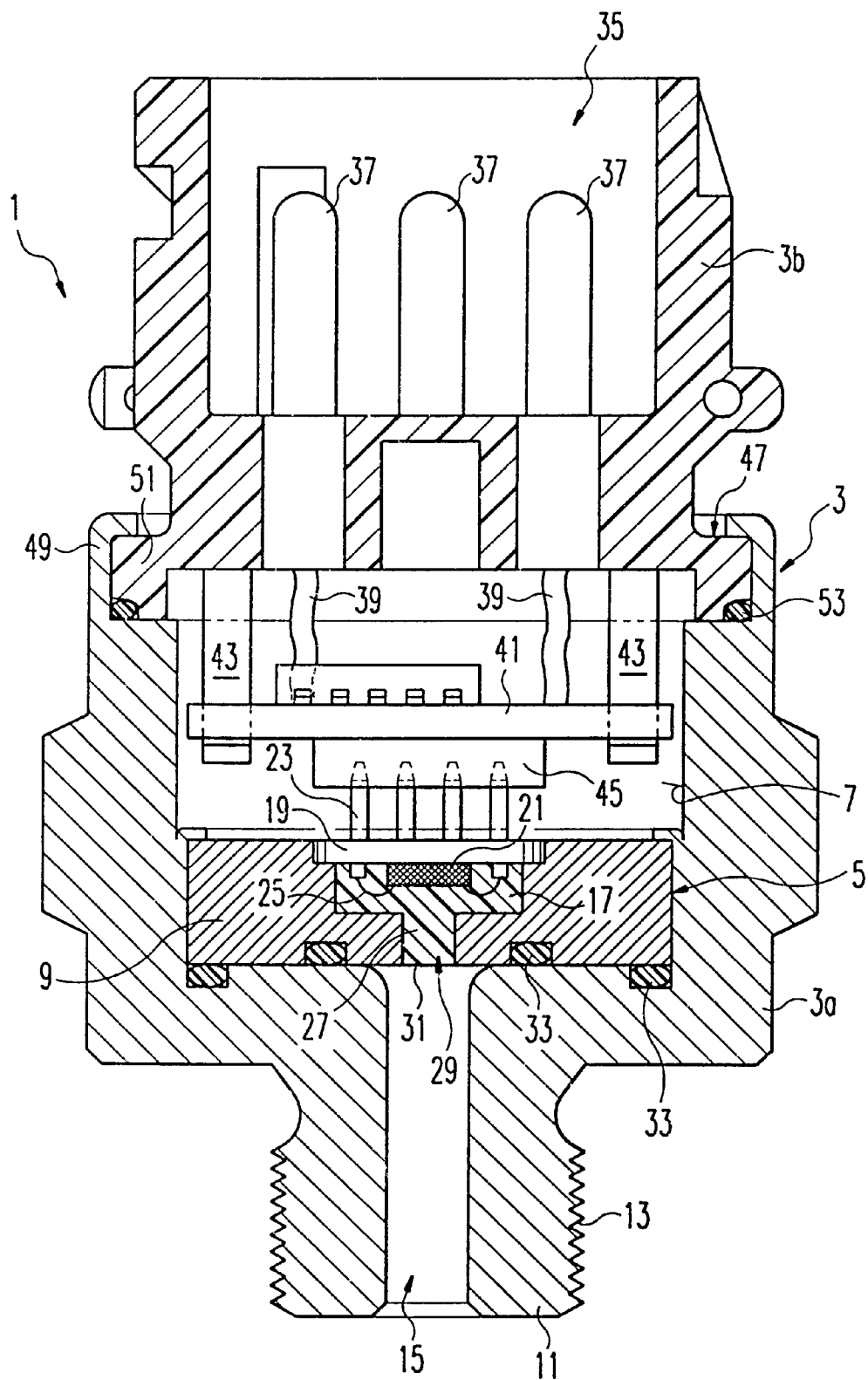
FIG. 1 is a longitudinal section through a specific embodiment of the pressure switching device according to the invention.

Referring now to the drawings wherein the showings are for the purposes of illustrating the preferred embodiment of the invention only and not for purposes of limiting same, FIG. 1 shows a preferred specific embodiment of a pressure switch device 1 which, according to this invention, comprises, in essence, a two-part housing 3 in which a measuring cell 5 is disposed. The pressure measuring cell 5 is mounted in a lower, first housing part 3a which defines a recess adapted to receive the pressure measuring cell 5. The recess 7 is preferably in the shape of a bore which preferably, at least in its lower part, has an inner diameter which corresponds in essence, to the outer diameter of the measuring cell housing 9. The measuring cell housing 9 is preferably disc-like shaped.

The first housing part 3a includes in its lower area an essentially circular cylindrical extension 11 which, by means of suitable external threading 13 provided thereon, is engageable into a corresponding tap hole at an installation site such, for example, into a cylinder of a brake system or into a motor vehicle engine block. For supply of the pressure medium whose pressure is to be recorded, or the monitored fluid such as oil or brake fluid, there is provided a supply aperture 15 extending from the frontal surface of the extension 11 of the first housing part 3a. The monitored fluid is transmitted through the supply aperture to the pressure measuring cell 5.

The pressure measuring cell 5 has a perforation 17 in its measuring cell housing 9 which, as shown in FIG. 1, preferably includes a bore having a relatively small diameter disposed in the lower area of the measuring cell housing 9. Preferably, the upper area measuring cell housing 9 defines a bore having a larger diameter than the bore in the lower part of the housing. In the upper area of the larger diameter bore, there is provide, relative to the diameter, an expanded area which is adapted to receive a support member 19 upon which arranged a suitable electronic pressure sensor 21. The pressure sensor is preferably a silicon membrane having an integrated piezo-resistive semiconductor resistance circuitry integral therewith. The support 19 includes contact pins 23 which are connected as illustrated by means of bond wires 25 to the pressure sensor 21. Although any type of support member can be used, the support member is preferably a TO-type housing which is customarily used for mounting transistors and other semiconductor devices. By using the inexpensive well known TO type housing, the pressure switching device of the present invention realizes reduced manufacturing cost advantages.

The To-type housing or its support 19 are preferably tightly welded together into the expanded upper area of the perforation of the metallic cell housing after they are placed there as illustrated. The resistance-type welding method is preferably used for mounting the housing and support which, realizes additional manufacturing cost advantages.

After the support 19 is welded together with the measuring cell housing 9 the remaining interior space of the perforation is preferably then filled with pressure transmission medium 27. The pressure transmission medium 27 preferably has a gel-type or jelly-like consistency. Preferably, the gel-type consistency and viscosity of the transmission medium is selected in such a manner that any draining of pressure medium 27 from the activation aperture 29 of the measuring cell housing 9 is prevented. At a minimum, the viscosity of the gel-type transmission medium is selected such that any draining or movement is at an acceptably slow rate even if the device is oriented as shown in FIG. 1. The device is preferably oriented during this manufacturing step such that the axis of the activation aperture extends parallel to the force of gravity with the activation aperture pointing in the upward direction.

With the use of pressure transmission medium 27 having the above described jelly-like consistency, any draining thereof is prevented because of the diminishing cross-section of the activation aperture 29 in the direction of the exit opening. The activation aperture 29 is more narrow at the supply aperture 15 side than at the pressure center 21 side.

Because the preferred pressure transmission medium has a jelly-like consistency, attention must be paid, however, that its hardness/elasticity is selected in such a manner that there is an effective pressure transmission from the exit opening of the activation aperture to the pressure sensor 21 itself. In that regard, the preferred pressure transmission medium 27 comprises a two-component silicon gel or a two-component silicon-caoutchouc-gel with respectively jelly-like or gel-type consistency. This type of material has been found particularly well suited as the pressure transmission medium 7 within the present invention. This type of pressure transmission medium has the benefit that immediately after mixing the two components, the pressure transmission medium retains a relatively high viscosity, so that simple filling of the spaces within the device is assured, particularly in the interior space of the perforation 17 within the measuring cell housing 9. Using this type of pressure transmission medium, complete fill up of the perforation is essentially guaranteed.

The two components comprising the pressure transmission medium "harden up" as a result of a chemical reaction, which can be selectively aided, for example, by the supply of additional external energy such as heat or UV light energy which is used to cause the components to more quickly take the desired jelly-like or gel-type consistency. The desired consistency is adjustable by specification of an appropriate mixing ratio for the two components.

After filling the interior space of the perforation 17 with the pressure transmission medium, a separation membrane 31 is disposed at the bottom of the first housing part 3a in recess 7 within the pressure sensing unit 1. The separation member is selected to be at least large enough so that it will cover the bottom-situated entry opening of the supply aperture 15 for the pressure transmission medium. In order to ensure a highly reliable sealing, the separation member 31 is preferably selected in the form of a circular member as best shown in FIG. 1, whereby the diameter of the separation member corresponds substantially to the inner diameter of the lower area of recess 7.

In order to securely seal the interior of housing 7 and, simultaneously, seal the interior space of perforation 17 of the measuring cell housing 9 against the pressure medium or monitored fluid supplied via the supply aperture 15, grooves are provided, both at the lower frontal side of the measuring cell housing 9 and also in the bottom of recess 7 of the lower housing part 3a, for acceptance of sealing elements 33 which, preferably, are O-rings. The depths of the grooves are preferably selected in such a manner that the sealing elements, which are suitably elastic and compressible, slightly protrude, in a non-mounted state of the cell housing, beyond the respective surface. After positioning the separation membrane 31 in recess 7 the measuring cell is inserted into the recess until it, likewise rests, with its underside on the separation membrane 31.

It is important that the measuring cell 5 is located in the position illustrated in FIG. 1. In that regard, sufficient pressure must be exercised on the measuring cell 5 in the direction toward the bottom of recess 7 so that adequate tightness is guaranteed. As depicted in FIG. 1, the measuring cell 5 is preferably located and placed by a peening process whereby one or several areas or a circumferential area of the lateral interior wall of recess 7 is peeled over and brought into a position which grabs behind the measuring cell housing. The lateral interior wall of recess 7 is curled over on top of the measuring cell 5. In this manner, it is possible to simultaneously generate a corresponding pressure upon the measuring cell housing 9, which, in essence, remains in place following the completion of the peening process. In this manner, by means of single production step, the interior space of the perforation 17 with the pressure transmission medium located therein, and the interior space of recess 7 of the lower housing part 3a are simultaneously sealed off.

With continued reference to FIG. 1, a connection plug area, preferably in the form of a socket, is defined in the upper second housing part 3b. The plug connection area is provided with connection contacts 37 which provide an electrical connection between the pressure sensor unit 1 and an external operatively associated intermatable plug (not shown). The connection contacts 37 are preferably connected by means of electrical connection lines 39 with an electronic circuit 41 which is likewise held in the upper second housing part 3b as illustrated. To that end, the electronic circuit 41 is positioned within the housing by means of any range of fastening elements such as shown in the figure or, alternatively, can be located and supported directly by the connection contacts or, by means of an injection molded body or the like injected directly into or otherwise disposed into the housing part 3b.

In one preferred form, the electronic circuit 41 comprises a printed conductor plate upon which are arranged a plurality of electric building elements. In addition, the conductor plate is provided with a holder 45 in the form of a socket for acceptance of the connection pins 23 of support 19. Because the holder 45 and connection pins 23 are intermatable, connecting the electronic circuit with the pressure sensor 21 takes place upon placement of the upper housing part 3b onto the lower housing part 3a.

For mounting the upper housing part 3b onto the lower housing part 3a, the lower housing part 3a is provided with an acceptance area 47 having a shoulder as a stop lug for the frontal side of the upper housing part 3b, as well as an upper housing wall 49 which, after placement of the upper housing part 3b onto the lower housing part 3a, protrudes via a shoulder 51 from the underside of the upper housing part 3b. The upper housing wall 49 is preferably crimped onto the acceptance area 47 after the joining of the two housing parts 3a, 3b into a firm engagement of mechanical housing parts. In order to ensure a tight closure of the housing interior, an additional sealing element 53 is preferably disposed within the switching device at a location where the housing parts 3a, 3b join such as illustrated in the figure. The additional sealing element 53 is preferably in the form of an O-ring.

The electronic circuit 41 is adapted to perform a plurality of switching functions and is adapted to effect signal amplification and compensate the sensor signal for variances in temperature.

Figure 2A:
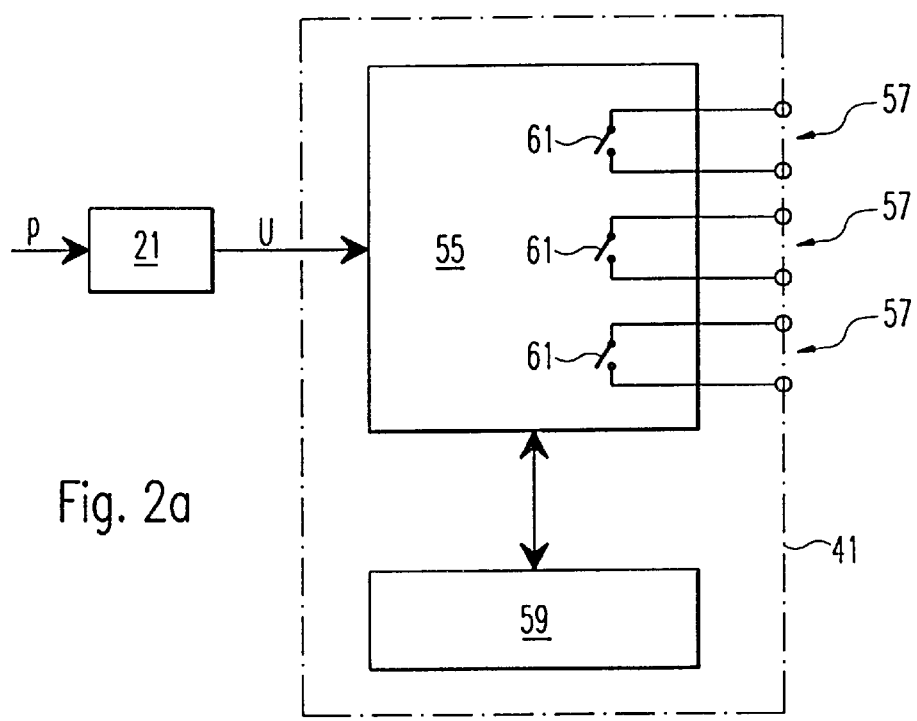
FIG. 2a is a functional circuit diagram of the electronics for signal processing in the first preferred embodiment of the invention.

With reference now to FIG. 2a, a first preferred embodiment of the electronic circuit 41 is illustrated whereat the electronic circuit is shown receiving a signal U transmitted from the pressure sensor 21. The pressure sensor 21 generates an analog electrical sensor signal U corresponding to the detected, preferably proportionate pressure p of the monitored fluid or monitored pressure medium. The electronic circuit 41 preferably comprises the interpretation and switching unit 55 as shown including several electrical contact points 57. The plurality of electrical contact points are connected to a corresponding plurality of electronic relays 61 as shown in the figure. Each of the poles of the electronic relays 61 are suitably connected to the plurality of contacts 37 of the housing 3 through the plurality of electrical contact points 57. As an example of the flexibility of the present invention, if switching is desired vis-a-vis a common reference potential, then the respective poles of the electronic relays 61 can be connected with each other and placed upon a common connection contact 37. As a further example, if switching is desired vis-a-vis the reference potential of an automobile body, then, in each case, only a single pole of the relays through the plurality of electrical contact points 57 are connected with a connection contact 37 and the respective other pole of the relay being placed upon the housing 3 which is connected via the extension 11 effecting a ground having a reference potential at the automobile vehicle body potential.

With continued reference to the figure, the interpretation and switching unit 55 is preferably provided with a memory for storing a plurality of switching threshold values. The memory 59 is preferably a non-transient memory such as, for example, a programmable read only memory (PROM).

In accordance with the embodiment represented in FIG. 2a, the interpretation and switching unit 55 effects, dependent upon the output signal U of the pressure sensor 21, the desired switching procedures by causing a closure of the electronic relays 61 assigned to the respective electrical contact points 57. Thus, the plurality of switching procedures effected by closure of the contacts are dependent upon the pressure p of the monitored pressure medium.

In the preferred embodiment of the present invention, a set of switching threshold values are stored in the memory, one for each of the three represented electrical contact point pairs 57 whereby, the interpretation and switching unit, is adapted to switch a first relay when the lowest switching threshold value is exceeded, switch a second relay contact when a second highest switching threshold value is exceeded, and, lastly, switch a third electrical relay contact when a third switching value is exceeded. Although the embodiment shown in FIG. 2a illustrates normally open contact points, normally closed contact points or combinations of normally open and normally closed contacts may be used as well.

The interpretation and switching unit 55 is further adapted to trigger a temporary sequence of addressing the electronic relays and electrical contact points due to exceeding or falling short of a switching threshold value. To that end, appropriate delay times are stored in the memory 59 in addition to the switching threshold values described above. For realization of a hysteresis with respect to pressure, two switching threshold values are additionally respectively assigned to each other as a switching threshold value pair. In that manner, the higher or lower of the switching threshold value pair defines the switching point for a switch over from a first switching state to a second switching state. The respective other of the switching threshold value pair values defines the switching point for the switch over from the second switching state to the first switching state. Thus, upon an increase in the monitored pressure over the higher of the two switching threshold values, a first signal is generated to trigger a first switch state which is extinguished to then trigger a second switch state only when the pressure falls below the lower of the two switching threshold values. In this manner, unstable conditions are avoided including oscillations between switching states. If only a single switching threshold value were used, short time fluctuations would occur when the monitored fluid is at or near the switching point. The present invention overcomes this instability.

Figure 2B:
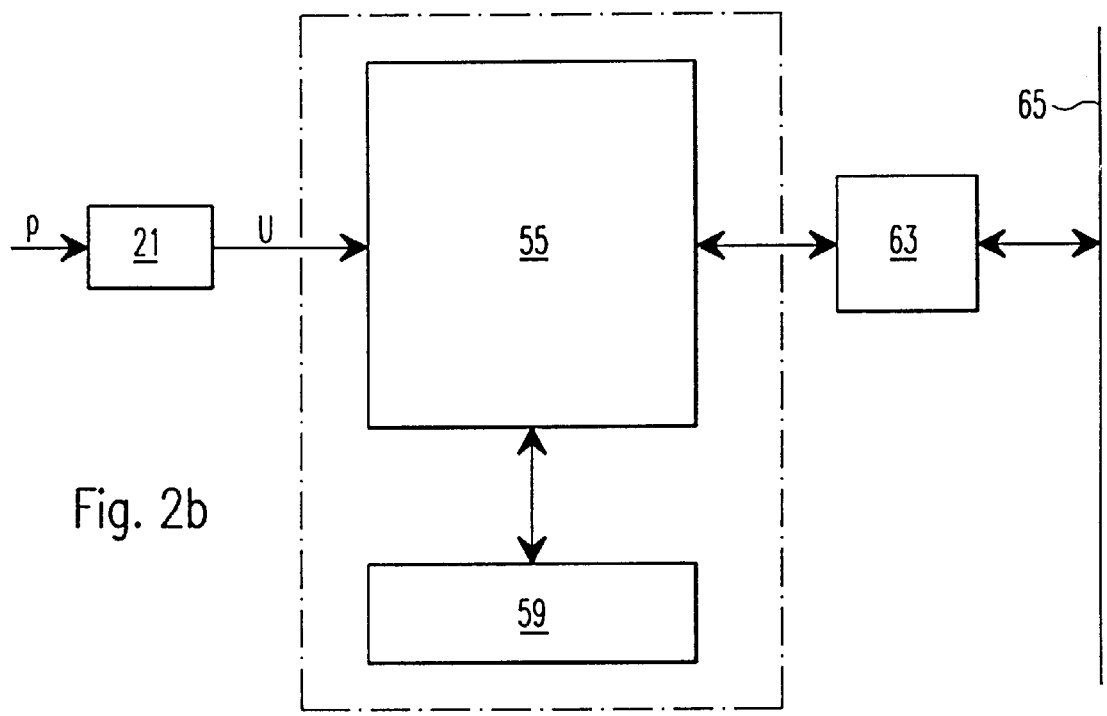
FIG. 2b is a circuit diagram of the electronics for signal processing in a second preferred embodiment of the invention.

With reference now to FIG. 2b, a second embodiment of the present invention is illustrated including an intelligent bus interface 63 operatively connected to the interpretation and switching unit 55. Together with the interpretation and switching unit 55, the intelligent bus interface 63 transmits data relating to the switching functions via a bus 65 to an external operatively associated higher ranking control unit (not shown). The intelligent bus interface 63 is preferably bidirectional and as such, is adapted to receive switching procedures from the external higher ranking control unit and pass those switching procedures on to the interpretation and switching unit 55. In the embodiment illustrated in FIG. 2b, the sensor signal U is preferably a digitized sensor signal adapted to integrate with the intelligent bus interface. This embodiment is advantageous in that the bus system is only burdened with a low data rate because the interpretation of the sensor signal U is performed by the pressure sensing device 1 and delivered onto the bus as a processed signal rather than as a raw analog data value.

In the above manner, the present invention offers an advantage of extremely simple adaptation of functions of the pressure switching device to meet changing customer needs and demands. According to the present invention, the only step needed to adapt the pressure switching device to alternate applications is a redesign of the interpretation and switching unit 55 or storage of modified switching threshold values into the memory 59. Compared with a complete redesign of the previously known mechanical pressure switches, the present invention costs less time and money to switch over to adapt to customer needs and different applications.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A pressure switch device for use in a motor vehicle, the pressure switch device comprising:

a pressure sensor disposed in a housing having a supply aperture, the pressure sensor generating an electrical sensor signal in accordance with a sensed pressure of a pressurized medium transmitted to said supply aperture in the housing; and, an interpretation and switching unit receiving said electrical sensor signal, the interpretation and switching unit being adapted to:

compare the electrical sensor signal with at least one switching threshold value and generate at least a one of a first switching function signal and a sequence of a second switching function signals based on a relative level between said electrical sensor signal and said at least one switching threshold value;

compare said electrical sensor signal with a first switching hysteresis threshold value and a second switching hysteresis threshold value higher than said first switching hysteresis threshold value; and, enter into a first operational state when said electrical sensor signal exceeds said second switching hysteresis threshold value and enter into a second operational state when said electrical sensor signal falls below said first switching hysteresis threshold value.

2. The pressure switching device according to claim 1, further comprising a memory device operatively associated with said interpretation and switching unit for storing said at least one switching threshold value, said first switching hysteresis threshold value, and said second switching hysteresis threshold value.

3. The pressure switch device according to claim 2 further comprising:

a bus interface device connected to said interpretation and switching unit, the bus interface device being adapted to receive said at least one of said first switching function signals and said sequence of second switching function signals from said interpretation and switching unit and transmit said at least one of said first switching function signals and said sequence of second switching function signals to an external control unit operatively associated with said pressure switch device.

4. A pressure switch device for use in a motor vehicle, the pressure switch device comprising:

a pressure sensor disposed in a housing having a supply aperture, the pressure sensor generating an electrical sensor signal in accordance with a sensed pressure of a pressurized medium transmitted to said supply aperture in the housing;

a memory device storing at least one switching threshold value; and, an interpretation an switching unit disposed in said housing and adapted to receive the electrical sensor signal and compare the electrical sensor signal with said at least one switching threshold value to generate at least a one of a first switching function signal and a sequence of a second switching function signals based on a relative level between said electrical sensor signal and said at least one switching threshold value, the interpretation and switching unit further being adapted to assign a timer value of a predetermined timer period to said at least one switching threshold value, the interpretation and switching unit further including means for maintaining said at least one of said first switching function signal and said sequence of second switching function signals generated for said predetermined timer period responsive to a change in said relative level between said electrical sensor signal and said at least one switching threshold value, the interpretation and switching unit further being adapted to compare said electrical sensor signal with a first switching hysteresis threshold value and a second switching hysteresis threshold value higher than said first switching hysteresis threshold value and enter into a first operational state when said electrical sensor signal exceeds said second switching hysteresis threshold value and enter into a second operational state when said electrical sensor signal falls below said first switching hysteresis threshold value.

5. The pressure switch device according to claim 4 wherein said first and second switching hysteresis threshold values are stored in said memory device.

6. The pressure switch device according to claim 5 wherein said interpretation and switching unit is an electronic microprocessor adapted to executed software.

7. The pressure switch device according to claim 6 wherein said interpretation and switching unit is an application specific integrated circuit.

8. The pressure switch device according to claim 7 wherein:

the interpretation and switching unit includes a plurality of electrical contact points; and, said housing includes a plurality of connection contacts electrically connected to said plurality of electrical contact points.

9. The pressure switch device according to claim 8 wherein:

said interpretation and switching unit includes a plurality of electronic relay contacts each of the plurality of electronic relay contacts being associated with said plurality of electrical contact points; and, said interpretation and switching unit is adapted to enter into a first switching state by selectively opening first ones of said plurality of electronic relay contacts and enter into a second switching state by selectively closing second ones of said plurality of electronic relay contacts.

10. The pressure switch device according to claim 9 further comprising:

a bus interface device connected to said interpretation and switching unit, the bus interface device being adapted to receive said at least one of said first switching function signals and said sequence of second switching function signals from said interpretation and switching unit and transmit said at least one of said first switching function signals and said sequence of second switching function signals to an external control unit operatively associated with said pressure switch device.

11. The pressure switch device according to claim 10 wherein said bus interface device is disposed in said housing.

12. A pressure switch device for use in a motor vehicle, the pressure switch device comprising:

a pressure sensor disposed in a housing having a supply aperture, the pressure sensor generating an electrical sensor signal in accordance with a sensed pressure of a pressurized medium transmitted to said supply aperture in the housing;

an electronic memory device disposed in said housing; and, an interpretation and switching unit disposed in said housing and adapted to receive said electrical sensor signal and compare the electrical sensor signal with at least one switching threshold value stored in said electronic memory device to generate at least a one of a first switching function signal and a sequence of a second switching function signals based on a relative level between said electrical sensor signal and said at least one switching threshold value.

13. The pressure switch device according to claim 12 further comprising a bus interface device connected to said interpretation and switching unit, the bus interface device being adapted to receive said at least one of said first switching function signals and said sequence of second switching function signals from said interpretation and switching unit and transmit said at least one of said first switching function signals and said sequence of second switching function signals to an external control unit operatively associated with said pressure switch device.

14. The pressure switch device according to claim 13 wherein said interpretation and switching unit is adapted to assign a timer value of a predetermined timer period to said a t least one switching threshold value.

15. The pressure switch device according to claim 14 wherein the interpretation and switching unit includes means for maintaining said at least one of said first switching function signal and said sequence of second switching function signals generated for said predetermined timer period responsive to a change in said relative level between said electrical sensor signal and said at least one switching threshold value.

16. The pressure switch device according to claim 15 wherein said interpretation and switching unit is adapted to:

compare said electrical sensor signal with a first switching hysteresis threshold value stored in said electronic memory device and a second switching hysteresis threshold value stored in said electronic memory device; and, enter into a first operational state when said electrical sensor signal exceeds said second switching hysteresis threshold value and enter into a second operational state when said electrical sensor signal falls below said first switching hysteresis threshold value.

17. The pressure switch device according to claim 16 wherein said interpretation and switching unit is an electronic microprocessor adapted to executed software.

18. The pressure switch device according to claim 17 wherein said interpretation and switching unit is an application specific integrated circuit.

19. The pressure switch device according to claim 18 wherein:
the interpretation and switching unit includes a plurality of electrical contact points; and,
said housing includes a plurality of connection contacts electrically connected to said plurality of electrical contact points.

20. The pressure switch device according to claim 19 wherein:
said interpretation and switching unit includes a plurality of electronic relay contacts each of the plurality of electronic relay contacts being associated with said plurality of electrical contact points; and,
said interpretation and switching unit is adapted to enter into a first switching state by selectively opening first ones of said plurality of electronic relay contacts and enter into a second switching state by selectively closing second ones of said plurality of electronic relay contacts.

21. The pressure switch device according to claim 12 wherein said interpretation and switching unit is adapted to assign a timer value of a predetermined timer period to said at least one switching threshold value.

22. The pressure switch device according to claim 21 wherein the interpretation and switching unit includes means for maintaining said at least one of said first switching function signal and said sequence of second switching function signals generated for said predetermined timer period responsive to a change in said relative level between said electrical sensor signal and said at least one switching threshold value.

23. The pressure switch device according to claim 22 wherein said interpretation and switching unit is adapted to:
compare said electrical sensor signal with a first switching hysteresis threshold value stored in said electronic memory device and a second switching hysteresis threshold value stored in said electronic memory device; and,
enter into a first operational state when said electrical sensor signal exceeds said second switching hysteresis threshold value and enter into a second operational state when said electrical sensor signal falls below said first switching hysteresis threshold value.

24. The pressure switch device according to claim 23 wherein said interpretation and switching unit is an electronic microprocessor adapted to executed software.

25. The pressure switch device according to claim 24 wherein said interpretation and switching unit is an application specific integrated circuit.

26. The pressure switch device according to claim 25 wherein:
the interpretation and switching unit includes a plurality of electrical contact points; and,
said housing includes a plurality of connection contacts electrically connected to said plurality of electrical contact points.

27. The pressure switch device according to claim 26 wherein:
said interpretation and switching unit includes a plurality of electronic relay contacts each of the plurality of electronic relay contacts being associated with said plurality of electrical contact points; and,
said interpretation and switching unit is adapted to enter into a first switching state by selectively opening first ones of said plurality of electronic relay contacts and enter into a second switching state by selectively closing second ones of said plurality of electronic relay contacts.

* * * * *